United States Patent
Swarup

(10) Patent No.: US 8,153,708 B2
(45) Date of Patent: Apr. 10, 2012

(54) PROCESS FOR FORMING A WATERBORNE COMPOSITE POLYURETHANE/ACRYLIC POLYMER DISPERSION

(75) Inventor: Shanti Swarup, Allison Park, PA (US)

(73) Assignee: PPG Industries Ohio, Inc, Cleveland, OH (US)

(*) Notice: Subject to any disclaimer, the term of this patent is extended or adjusted under 35 U.S.C. 154(b) by 200 days.

(21) Appl. No.: 12/752,372

(22) Filed: Apr. 1, 2010

(65) Prior Publication Data

US 2011/0245415 A1 Oct. 6, 2011

(51) Int. Cl.
*C08J 3/00* (2006.01)

(52) U.S. Cl. ......................................... 523/336

(58) Field of Classification Search ............... 523/336
See application file for complete search history.

(56) References Cited

U.S. PATENT DOCUMENTS

| 4,644,030 A | 2/1987 | Loewrigkeit et al. |
| 2006/0148980 A1* | 7/2006 | Tielemans et al. ............ 524/591 |

* cited by examiner

*Primary Examiner* — Edward Cain
(74) *Attorney, Agent, or Firm* — Kris Shideler

(57) ABSTRACT

The present invention provides a process for forming a waterborne composite polyurethane/acrylic polymer dispersion without the use of N-methyl pyrrolidone. The process includes polymerizing a reaction mixture of polyisocyanate, polyol, and a hydroxyl and carboxylic acid functional reactant in an organic solvent medium of alkyl carbonate, then adding ethylenically unsaturated monomers and inverting the mixture into an aqueous medium. Addition polymerization is performed to yield a waterborne composite polyurethane/ acrylic polymer dispersion, and any remaining alkyl carbonate is hydrolyzed. The resulting aqueous polymer dispersions are environmentally friendly and are suitable for use in coating compositions that conventionally contained similar dispersions prepared in the presence of N-methyl pyrrolidone. Comparable physical properties are observed.

16 Claims, No Drawings

PROCESS FOR FORMING A WATERBORNE COMPOSITE POLYURETHANE/ACRYLIC POLYMER DISPERSION

FIELD OF THE INVENTION

The present invention is directed to a process for forming a waterborne composite polyurethane/acrylic polymer dispersion without the use of N-methylpyrrolidone.

BACKGROUND OF THE INVENTION

Many polyurethane dispersions contain N-methylpyrrolidone (NMP), because it is often a required component in the polymerization process. In fact, NMP has been the solvent of choice for the widely used prepolymer mixing process (PMP) for aqueous polyurethane dispersion (PUD) synthesis. This particular solvent reduces the prepolymer viscosity during the production steps to enabling smooth handling and dispersing of the prepolymer. This is due to the good solubilizing characteristics of NMP for organic materials and its own water solubility. N-methylpyrrolidone also supports the coalescence of the dispersion particles when the dispersion is applied to a substrate, and thereby facilitates film formation.

Unfortunately, various studies have suggested that NMP may be a fetotoxin. Recent studies on NMP have persuaded the EU Commission Working Group on the Classification and Labeling of Dangerous Substances to label NMP as toxic. Formulations containing at least 5% NMP have to be labeled as being irritant and toxic "T". In the United States, on Mar. 14, 2003, the State of California Office of Environmental Health Hazard Assessment (OEHHA) issued a Notice of Proposed Rulemaking to adopt regulatory levels for NMP listed pursuant to the Act as known to the State to cause reproductive toxicity (Title 22, California Code of Regulations, Section 12000). California Proposition 65 requires special labeling for products containing NMP.

In response to global regulations, a worldwide effort in the paint industry is being made to eliminate NMP from coating formulations. Alternative production processes have been developed to make aqueous polyurethane dispersions without NMP. These include methods to prepare these polymeric dispersions with alternate co-solvents such as ethylenically unsaturated monomers or polyurethane prepolymers that behave as reactive diluents, as well as with co-solvents such as acetone that can be removed from the product during processing. However, these approaches all have drawbacks such as poorer solubility of the polyurethane prepolymer, higher price, or limited availability. Some of the available co-solvents prevent the formation of a stable aqueous dispersion of the polyurethane polymer after preparation.

It would be desirable to provide an effective, low-cost process for preparing a stable polyurethane/acrylic polymer dispersion without the drawbacks of the prior art attempts.

SUMMARY OF THE INVENTION

The present invention provides a process for forming a waterborne composite polyurethane/acrylic polymer dispersion. The process comprises:
 (a) introducing a reaction mixture to an organic solvent medium, the reaction mixture comprising:
  (i) a polyisocyanate;
  (ii) a polyol; and
  (iii) a reactant containing both hydroxyl and carboxylic acid functional groups; wherein the organic solvent medium is essentially free of N-methylpyrrolidone and comprises an alkyl carbonate;
 (b) allowing the reaction mixture to polymerize and yield a polyurethane polymer in the organic solvent medium, the polyurethane polymer having terminal isocyanate functional groups and pendant acid functional groups;
 (c) adding a monoamine to the organic solvent medium to neutralize pendant acid functional groups on the polyurethane polymer;
 (d) adding one or more ethylenically unsaturated monomers to the organic solvent medium;
 (e) inverting the organic solvent medium containing the polyurethane polymer and ethylenically unsaturated monomers into an aqueous medium containing one or more polyamines to form an aqueous dispersion;
 (f) adding a free radical polymerization initiator to the aqueous dispersion;
 (g) holding the aqueous dispersion at a temperature and for a time sufficient to polymerize the ethylenically unsaturated monomers and yield a waterborne composite polyurethane/acrylic polymer dispersion; and
 (h) heating the aqueous dispersion to a temperature and for a time sufficient to hydrolyze the alkyl carbonate. Note that the order of some of the process steps may be altered or steps may be combined and performed simultaneously with the same results and without departing from the scope of the invention. For example, step (c) may be performed immediately prior to, simultaneously with, or immediately following step (d).

DETAILED DESCRIPTION OF THE INVENTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

As used herein, the term "polymer" is meant to refer to oligomers and both homopolymers and copolymers.

Also for molecular weights, whether number average ($M_n$) or weight average ($M_w$), these quantities are determined by gel permeation chromatography using polystyrene as standards as is well known to those skilled in the art and such as is discussed in U.S. Pat. No. 4,739,019, at column 4, lines 2-45.

As used herein "based on total weight of the resin solids" of the composition means that the amount of the component added during the formation of the composition is based upon the total weight of the resin solids (non-volatiles) of the film forming materials, polyurethanes, cross-linkers, and polymers present during the formation of the composition, but not including any water, solvent, or any additive solids such as hindered amine stabilizers, photoinitiators, pigments including extender pigments and fillers, flow modifiers, catalysts, and UV light absorbers.

As used herein, "formed from" denotes open, e.g., "comprising," claim language. As such, it is intended that a composition "formed from" a list of recited components be a composition comprising at least these recited components, and can further comprise other nonrecited components during the composition's formation.

The present invention is directed to a process for forming a waterborne composite polyurethane/acrylic polymer dispersion. The first step in the process comprises (a) introducing a reaction mixture to an organic solvent medium. The organic solvent medium is essentially free of N-methyl pyrrolidone. By "essentially free" is meant that if the material is present in the medium, it is present incidentally in an amount less than 0.1 percent by weight, preferably less than trace amounts. The organic solvent medium is typically an alkyl carbonate. Suitable alkyl carbonates include ethylene carbonate, propylene carbonate, butyl carbonate, dimethyl carbonate, diethyl carbonate, methylethyl carbonate, and/or dibutyl carbonate. Alkyl carbonates, unlike other solvents such as ketones and esters, allow for the subsequent formation of stable polymer dispersions. By "stable dispersion" is meant one that does not settle or is easily redispersible if some settling occurs. Comparative examples shown below demonstrate the superior stability of waterborne polymer dispersions, achieved when alkyl carbonates are used as the solvent medium during polymerization. It is particularly notable that dibasic esters, often promoted as "green" (i.e., environmentally friendly) solvent replacements for N-methylpyrrolidone, do not yield stable polymer dispersions.

The reaction mixture comprises (i) a polyisocyanate; (ii) a polyol; and (iii) a reactant containing both hydroxyl and carboxylic acid functional groups. Suitable polyisocyanates include aliphatic, cycloaliphatic, araliphatic, and/or aromatic isocyanates, and mixtures thereof. Often, the polyisocyanate is aliphatic or cycloaliphatic.

Examples of useful aliphatic and cycloaliphatic polyisocyanates include 4,4-methylenebisdicyclohexyl diisocyanate (hydrogenated MDI), hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), and cyclohexylene diisocyanate (hydrogenated XDI). Other aliphatic polyisocyanates include isocyanurates of IPDI and HDI. Isophorone diisocyanate is used most often.

Examples of suitable aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI) and phenylene diisocyanate.

The amount of polyisocyanate (i) used in the reaction mixture generally ranges from about 10 to about 60 percent by weight, often about 20 to about 50 percent by weight, and more often about 30 to about 45 percent by weight based on total weight of the resin solids used to prepare the polyurethane.

The polyol (ii) used in the reaction mixture may be any polymeric polyols used or suitable to be used in polyurethane formulations. Low molecular weight diols may also be used. Examples of suitable low molecular weight polyols include diols, triols, and tetrols having 1 to 10 carbon atoms such as ethylene glycol, 1,2-propylene glycol, 1,4-butanediol, trimethylolpropane, ditrimethylolpropane, trimethylolethane, glycerol, pentaerythritol and sorbitol. Examples of other low molecular weight polyols are ether polyols such as diethylene glycol and ethoxylated Bisphenol A. Polymeric polyols having molecular weights in the range of 200-6000 are typically used. In particular, the polyols may be hydroxyl functional polyesters, polyethers (polyoxyalkylene polyols) such as polyoxyethylene polyols including polyethylene glycols and methoxypolyethylene glycols, polyoxypropylene polyols, and/or polyoxytetramethylene polyols, polythioethers, polycarbonates, polyacetals, polyolefins and/or polysiloxanes.

As noted above, examples of polyether polyols may include polyalkylene ether (polyoxyalkylene) polyols, which include those having the following structural formula:

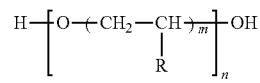

wherein the substituent R is hydrogen or lower alkyl containing from 1 to 5 carbon atoms including mixed substituents, m is an integer from 1 to 4, preferably 1 or 2, and n is an integer typically ranging from 5 to 200. Useful polyether polyols include poly(oxytetramethylene) glycols, such as TERATHANE® 650, commercially available from E. I. du Pont de Nemours and Company, LaPorte, Tex., poly(oxyethylene) glycols, poly(oxy-1,2-propylene) glycols and the reaction products of ethylene glycol with a mixture of 1,2-propylene oxide and ethylene oxide. These materials are obtained by the polymerization of alkylene oxides such as ethylene oxide, propylene oxide and tetrahydrofuran.

Also, polyethers obtained from the oxyalkylation of various polyols, for example, diols such as 1,6-hexanediol or higher polyols such as trimethylolpropane and sorbitol can be used. One commonly utilized oxyalkylation method is by reacting a polyol with alkylene oxide such as ethylene or propylene oxide in the presence of an acidic or basic catalyst in a manner well known to those skilled in the art.

Polyester polyols include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric, and adipic acids or their methyl esters, phthalic anhydride, or dimethyl terephthalate. Polyesters obtained by the polymerization of lactones, for example caprolactone, in conjunction with the polyol may also be used. A particularly suitable polyester polyol is poly(1,6-hexanediol adipate), molecular weight about 2000, available as Formrez 66-56 from Witco Corporation. Mixtures of polyols are often used in the reaction mixture.

Examples of polycarbonate polyols are described in U.S. Pat. No. 4,692,383 in col. 1, line 58 to col. 4, line 14, which is incorporated herein by reference.

The amount of polyol (ii) used in the reaction mixture generally ranges from about 5 to about 60 percent by weight, often about 10 to about 40 percent by weight, and more often about 20 to about 30 percent by weight based on total weight of the resin solids used to prepare the polyurethane.

The reactant (iii) containing both hydroxyl and carboxylic acid functional groups include carboxy group containing diols and triols, for example dihydroxyalkanoic acids of the formula R—C—($CH_2OH)_2$(COOH), wherein R is hydrogen or a $C_1$-$C_{10}$ alkyl group. Specific examples include 3-hydroxy-2-(hydroxymethyl)-2-methyl-propanoic acid (dimethylol propionic acid), 2,2-di(hydroxymethyl)acetic acid, 2,2,2-tri(hydroxymethyl)acetic acid, 2,2-di(hydroxymethyl) butyric acid, 2,2-di(hydroxymethyl)pentanoic acid, and the like. Other suitable reactants include oligomeric or polymeric polyols having a carboxylic acid group. The reactant (iii) is typically dimethylol propionic acid. Historically, N-methylpyrrolidone was required to dissolve dimethylol propionic acid. In the process of the present invention, the reactant (iii) is soluble in the organic solvent medium.

The amount of reactant (iii) used in the reaction mixture generally ranges from about 1 to about 15 percent by weight, often about 3 to about 10 percent by weight, and more often about 4 to about 7 percent by weight based on total weight of the resin solids used to prepare the polyurethane.

After the reaction mixture is introduced to the organic solvent medium in step (a), it is allowed to polymerize (step (b)) and yield a polyurethane polymer having terminal isocyanate functional groups and pendant acid functional groups. The reaction mixture may be added to the organic solvent all at once, or more often, it is added in stages as separate charges. For example, the polyol (ii) and reactant (iii) may be added first in stages and heated to a temperature and for a time sufficient to polymerize the components and achieve a desired acid value (typically in the range of 35 to 40), followed by addition of the polyisocyanate (i). The resulting polyurethane polymer is present in the organic solvent medium at 60 to 90 percent by weight solids, typically 80 percent by weight solids.

In step (c) of the process of the present invention, a monoamine is added to the organic solvent medium to neutralize the polyurethane polymer by reacting with pendant acid functional groups on the polyurethane polymer. Neutralization can range from about 0.1 to about 2.0, usually about 0.4 to about 1.3, of the total theoretical neutralization equivalent. Suitable monoamines include ammonia, alkyl amines such as triethylamine, and alkanolamines such as monoethanolamine, diethanolamine, dimethylethanolamine, diisopropanolamine, and the like. Mixtures or staged combinations of two or more amines may also be used. The appropriate amount of the amine is often 0.5 to 1.0 times the total theoretical neutralization equivalent.

The monoamine may be added under any suitable conditions, such as, for example, from room temperature up to a reaction temperature of 60° C. to 75° C.

Note that step (c) may be performed immediately prior to, simultaneously with, or immediately following step (d). Step (d) of the process of the present invention comprises adding one or more ethylenically unsaturated monomers to the organic solvent medium. Suitable ethylenically unsaturated monomers include alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Difunctional monomers such as ethylene glycol dimethacrylate and hexanediol diacrylate may also be used. Suitable other copolymerizable ethylenically unsaturated monomers include vinyl compounds such as styrene and vinyl toluene.

The amount of each ethylenically unsaturated monomer may vary depending on the desired properties of the final product, but typically the total amount of ethylenically unsaturated monomer used ranges from 20 to 80 percent by weight, often 30 to 60 percent by weight, based on the total weight of resin solids in the polymer composition.

At this point the organic solvent medium containing the polyurethane polymer and ethylenically unsaturated monomers is inverted into an aqueous medium to form an aqueous dispersion, in accordance with step (e) of the process of the present invention. The term "dispersion" refers to a two-phase transparent, translucent or opaque resinous system in which the resin is in the dispersed phase and the water is the continuous phase. The aqueous medium typically contains one or more polyamines. For example, the polyamine present in the aqueous medium may comprise diethyltriamine, ethylene diamine, and/or polymeric polyamines. Polymeric polyamines may be derived, for example, from propylene oxide, ethylene oxide, or a mixture thereof. Examples of such polymeric polyamines include those available under the designation JEFFAMINE™ from Huntsman Corporation. Such amines typically have a molecular weight ranging from 200 to 7500, such as, without limitation, JEFFAMINE D-230, D-400, D-2000, T-403 and T-5000.

Generally, the concentration of the resinous phase in the aqueous medium ranges from about 10 to about 60 percent, and usually about 20 to about 50 percent, and preferably about 25 to about 45 percent by weight based on total weight of the aqueous dispersion.

Upon formation of the aqueous dispersion, a free radical polymerization initiator may be added to the dispersion and then the dispersion held at a temperature and for a time sufficient to polymerize the ethylenically unsaturated monomers and yield a waterborne composite polyurethane/acrylic polymer dispersion. For example, the aqueous dispersion may be held at a temperature of 60° C. for at least 15 minutes to promote the addition polymerization reaction. Any art-recognized free radical polymerization initiator may be used; for example, organic peroxides, azo compounds, and/or persulfate compounds such as benzoyl peroxide, tert-amyl peracetate, or N,N-azobis(isobutyronitrile) are suitable.

In step (h) of the process of the present invention, the aqueous dispersion is heated to a temperature and for a time sufficient to hydrolyze the alkyl carbonate. For example, the aqueous dispersion may be heated to a temperature of 50 to 90° C., typically 80° C., for at least one hour, often about three hours to five hours.

It has been found that the polymer dispersions formed by the process of the present invention may be incorporated into film-forming compositions, including curable film-forming compositions, with rheological and appearance properties that are comparable to film-forming compositions prepared using similar polymer dispersions that were formed using N-methylpyrrolidone in the reaction mixture. In other words, polymer dispersions prepared by the process of the present invention offer no detrimental effects to the properties of film-forming compositions in which they are used.

The invention will further be described by reference to the following examples. The examples illustrate the process of the present invention, as well as comparative processes with alternative N-methylpyrrolidone replacements and with elimination of certain process steps. The examples are merely illustrative of the invention and are not intended to be limiting. Unless otherwise indicated, all parts are by weight.

EXAMPLES

Example 1

Control

This example demonstrates synthesis of a dispersion using n-methyl pyrrolidone as a solvent.

| Feed | Ingredient | Parts by weight |
|---|---|---|
| 1. | N-methyl pyrrolidone | 69.8 |
|  | FORMEZ 66-56[1] | 134.9 |
| 2. | MPEG 2000[2] | 34.0 |
|  | Dimethyl propionic acid | 23.6 |
| 3. | N-methyl pyrrolidone | 5.3 |
|  | Isophorone diisocyanate | 99.8 |
| 4. | Dibutyltin dilaurate | 0.27 |
|  | N-methyl pyrrolidone | 2.6 |
| 5. | Methyl methacrylate | 110.6 |
|  | Butyl acrylate | 76.4 |
|  | Ethylene glycol dimethacrylate | 7.8 |
| 6. | Dimethyl ethanol amine | 15.7 |
| 7. | Deionized water | 1339.3 |

-continued

| Feed | Ingredient | Parts by weight |
|---|---|---|
|  | Diethylene triamine | 12.8 |
| 8. | Ammonium persulfate | 0.7 |
|  | Deionized water | 67.2 |

[1]Poly (1,6-hexanediol adipate), molecular weight about 2000, from Witco Corporation
[2]Methoxy polyethylene glycol, molecular weight about 2000

Into a clean dry reactor equipped with heating, cooling, stirring and nitrogen blanket were charged feeds 1 and 2 with agitation. The mixture was heated to 71° C. and held at this temperature for 15 minutes. After this hold, Feeds 3 and 4 were added. The mixture was then heated to 90° C. and held at this temperature till the isocyanate equivalent weight was in the range of 850 to 1050. The mixture was then cooled to 60° C., followed by the addition of feed 5 while cooling the reactor to 35° C. At this temperature feed 6 was added. The pre-polymer/monomer mixture was then transferred to another reactor containing feed 7. The resulting dispersion was heated to 60° C., followed by the addition of feed 8. The solution was then heated to 80° C. and held at this temperature for 30 minutes. The product was allowed to room temperature. The finished product had a total solids 24.1%, pH 8.03, viscosity 13 centipoise, and particle size 78 nanometers.

Example 2

Comparative

This example demonstrates synthesis of a dispersion using propylene carbonate as a solvent. This example was prepared in the same way as example 1, but N-methylpyrrolidone was replaced by propylene carbonate in all the feeds. The finished product had a total solid 23.2%, pH 7.42, viscosity 25 centipoise, and particle size 12,196 nanometers. The resultant dispersion was unstable, demonstrating settling, presumably due to the large particle size. Moreover, slow, continuous hydrolyzing of the propylene carbonate at room temperature caused foaming of the dispersion.

Example 3

This example demonstrates synthesis of a dispersion using propylene carbonate (PC) as a solvent, but the finished resin was held at 80° C. for 5 hours, allowing the propylene carbonate to hydrolyze to propylene glycol (PG). This example was prepared in the same way as example 1, but upon the completion of feed 8, the resin was held at 80° C. for 5 hours and then allowed to cool to room temperature. The finished product had a total solid 24.2%, pH 7.8, viscosity 13 centipoise, and particle size 100.4 nanometers. See table below for data demonstrating the hydrolysis of PC to PG (propylene glycol) over time at 80° C. As PC hydrolyzes, its amount decreases at the expense of generating PG.

| Initial | 1 hr after | 2 hr after | 3 hr after | 4 hr after | 5 hr after |
|---|---|---|---|---|---|
| PC, 3.9% | PC, 1.34% | PC, 0.81% | PC, 0.36% | PC, 0.2% | PC, 0.11% |
| PC, 0.67 mol | PC, 0.23 mol | PC, 0.139 mol | PC, 0.062 mol | PC, 0.034 mol | PC, 0.0189 mol |
| PG, 0 % | PG, 1.58% | PG, 1.96% | PG, 2.29% | PG, 2.34% | PG, 2.49% |
|  | PG, 0.41 mol | PG, 0.515 mol | PG, 0.602 mol | PG, 0.616 mol | PG, 0.655 mol |

Example 4

This example demonstrates synthesis of a dispersion using diethyl carbonate as a solvent, but the finished resin was held at 80° C. for 3 hours. This example was prepared in the same way as example 1, but N-methyl pyrrolidone was replaced by diethyl carbonate in all the feeds. The finished product had a total solid 24.2%, pH 8.01, viscosity 13 centipoise, and particle size 103.8 nanometers.

Example 5

This example demonstrates synthesis of a dispersion using dimethyl carbonate as a solvent, but the finished resin was held at 80° C. for 3 hours. This example was prepared in the same way as example 1, but N-methyl pyrrolidone was replaced by dimethyl carbonate in all the feeds. The finished product had a total solid 24.3%, pH 8.03, viscosity 13.0 centipoise, and particle size 109.9 nanometers.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

I claim:

1. A process for forming a waterborne composite polyurethane/acrylic polymer dispersion, the process comprising:
   (a) introducing a reaction mixture to an organic solvent medium, the reaction mixture comprising:
      (i) a polyisocyanate;
      (ii) a polyol; and
      (iii) a reactant containing both hydroxyl and carboxylic acid functional groups; wherein the organic solvent medium is essentially free of N-methyl pyrrolidone and comprises an alkyl carbonate;
   (b) allowing the reaction mixture to polymerize and yield a polyurethane polymer in the organic solvent medium, the polyurethane polymer having terminal isocyanate functional groups and pendant acid functional groups;
   (c) adding a monoamine to the organic solvent medium to neutralize pendant acid functional groups on the polyurethane polymer;
   (d) adding one or more ethylenically unsaturated monomers to the organic solvent medium;
   (e) inverting the organic solvent medium containing the polyurethane polymer and ethylenically unsaturated monomers into an aqueous medium containing one or more polyamines to form an aqueous dispersion;
   (f) adding a free radical polymerization initiator to the aqueous dispersion;
   (g) holding the aqueous dispersion at a temperature and for a time sufficient to polymerize the ethylenically unsaturated monomers and yield a waterborne composite polyurethane/acrylic polymer dispersion; and
   (h) heating the aqueous dispersion to a temperature and for a time sufficient to hydrolyze the alkyl carbonate.

2. The process of claim 1, wherein the alkyl carbonate comprises ethylene carbonate, propylene carbonate, butyl carbonate, dimethyl carbonate, diethyl carbonate, methylethyl carbonate, and/or dibutyl carbonate.

3. The process of claim 1, wherein the polyisocyanate (i) comprises aliphatic polyisocyanates, cycloaliphatic polyisocyanates, araliphatic polyisocyanate, and/or aromatic polyisocyanates.

4. The process of claim 3, wherein the polyisocyanate comprises isophorone diisocyanate, tetramethyl xylylene diisocyanate, trimethylhexamethylene diisocyanate, and/or hexamethylene diisocyanate.

5. The process of claim 4, wherein the polyisocyanate is isophorone diisocyanate.

6. The process of claim 1, wherein the polyol (ii) comprises at least one polyoxyalkylene polyol.

7. The process of claim 6, wherein the polyoxyalkylene polyol comprises a polyoxyethylene polyol, a polyoxypropylene polyol, and/or polyoxytetramethylene polyol.

8. The process of claim 1, wherein the reactant (iii) containing both hydroxyl and carboxylic acid functional groups comprises dimethylol propionic acid.

9. The process of claim 1, wherein step (c) is performed immediately prior to, simultaneously with, or immediately following step (d).

10. The process of claim 1, wherein the monoamine added during step (c) comprises dimethylethanolamine.

11. The process of claim 1, wherein the ethylenically unsaturated monomer comprises methyl methacrylate, butyl acrylate, ethylene glycol dimethacrylate, and/or hexanediol diacrylate.

12. The process of claim 1, wherein the polyamine present in the aqueous medium comprises diethyltriamine, ethylene diamine, and/or a polymeric polyamine.

13. The process of claim 1, wherein in step (h), the aqueous dispersion is heated to a temperature of 50 to 90° C. for at least one hour.

14. The process of claim 1, wherein the free radical polymerization initiator comprises a peroxide compound, an azo compound and/or a persulfate compound.

15. The process of claim 1, wherein in step (g), the aqueous dispersion is held at a temperature of at least 60° C. for at least 15 minutes.

16. The process of claim 1, wherein in step (c), the monoamine is used in an amount of 0.1 to 1.0 times the total theoretical neutralization equivalent.

* * * * *